US007963850B2

(12) United States Patent
Moreno

(10) Patent No.: US 7,963,850 B2
(45) Date of Patent: *Jun. 21, 2011

(54) METHOD OF DEVELOPING THE ACTIVITY OF AN ON-LINE FORECASTING SITE

(75) Inventor: Roland Moreno, Paris (FR)

(73) Assignee: Innovatron, Paris (FR)

( * ) Notice: Subject to any disclaimer, the term of this patent is extended or adjusted under 35 U.S.C. 154(b) by 1049 days.

This patent is subject to a terminal disclaimer.

(21) Appl. No.: 11/808,137

(22) Filed: Jun. 6, 2007

(65) Prior Publication Data

US 2008/0293480 A1 Nov. 27, 2008

Related U.S. Application Data

(63) Continuation-in-part of application No. 11/802,774, filed on May 24, 2007, now Pat. No. 7,896,744.

(51) Int. Cl.
*G06F 17/00* (2006.01)

(52) U.S. Cl. .......................................................... 463/42

(58) Field of Classification Search .................... 463/40, 463/42; 705/14; 273/430–432

See application file for complete search history.

(56) References Cited

U.S. PATENT DOCUMENTS

| | | | | |
|---|---|---|---|---|
| 6,447,397 | B1 * | 9/2002 | Jaeger et al. | 464/37 |
| 7,244,180 | B2 * | 7/2007 | McHugh | 463/40 |
| 2002/0042293 | A1 * | 4/2002 | Ubale et al. | 463/9 |
| 2007/0033107 | A1 * | 2/2007 | Ubale et al. | 705/14 |

* cited by examiner

*Primary Examiner* — Ronald Laneau

(74) *Attorney, Agent, or Firm* — Jacobson Holman PLLC

(57) ABSTRACT

An on-line-game method involves a question engine coupled to a plurality of terminals controlled by game players, with game activity measured by a traffic index representative of the number of game players over a given time interval, a) displaying on the terminals questions, sent by the question engine, relating to a success parameter concerning at least one future event and advertising insertions paid for at a given tariff, b) evaluating receipts associated with the paid-for advertising insertions, c) setting up an endowment for allocating prizes over a given time period, the endowment being a function of the level of the receipts, d) on detecting an increase in the traffic index above a given threshold, correspondingly increasing the tariff, e) on detecting an increase in the receipts above another given threshold, correspondingly increasing the endowment, and f) repeating steps d) and e).

14 Claims, 2 Drawing Sheets

METHOD OF DEVELOPING THE ACTIVITY OF AN ON-LINE FORECASTING SITE

This is a continuation-in-part of Ser. No. 11/802,774, filed May 24, 2007, now U.S. Pat. No. 7,896,744 the disclosure of which is incorporated herein by reference.

CONTEXT OF THE INVENTION

1. Field of the Invention

The invention relates to a method of developing the activity of an on-line games type site, and more precisely a forecasting site.

2. Description of Related Art

Numerous interactive electronic games are known, for example those described in U.S. Pat. No. 6,758,754 ("System and method for interactive game-play scheduled based on real-life events"); U.S. Pat. No. 6,783,460 ("Method and apparatus for coordinating an interactive computer game with a broadcast television program"); U.S. Pat. No. 6,322,074 ("Interactive quiz game system and method"); U.S. Pat. No. 6,227,974 ("Interactive game system"); U.S. Pat. No. 6,210,272 ("Multiplayer interactive electronic game for health education"); U.S. Pat. No. 5,791,199 ("Interactive consumer product promotion method and match game"); U.S. Pat. No. 5,679,075 ("Interactive multimedia game system and method"); U.S. Pat. No. 6,267,379 ("Electronically interactive location-based multimedia game system and method"); and U.S. Pat. No. 6,299,535 ("Method of processing interactive game, program product and game system for the same"); the disclosures whereof are incorporated herein by reference.

On-line games are also described in currently pending applications in the name of Moreno U.S. Ser. No. 11/138,393 of May 27, 2005 ("Computer-implemented question and answer game"); U.S. Ser. No. 11/233,501 of Sep. 23, 2005 ("Game based on combinations of words and implemented by the computer system"); and U.S. Ser. No. 11/598,228 of Nov. 13, 2006 ("Computer-implemented game based on combinations of words"); the disclosures whereof are likewise incorporated herein by reference.

Games, in particular on-line games, usually include a considerable random element, i.e. they call more on luck and chance than on the knowledge or the shrewdness of the player. Some such games are pure games of chance, such as lottery games and many casino games.

Another major characteristic of on-line games is the need for the player to bet a stake in the hope of obtaining a winning, with winnings generally increasing with increasing size of stakes. Such games thus involve players taking risks, which can put a brake on the development of the activity of the site, unless only small stakes are required, but that leads to small winnings, and thus to smaller motivation for the players.

Some game sites exist that do not require players to place stakes, however they are generally only amusement sites that recompense players only with non-monetary "points", without there being any way of obtaining an actual recompense in the form of a prize, a sum of money, a purchase voucher, etc.

One of the aims of the invention is to propose a method of developing the activity of a game site that constitutes a credible alternative to everything that has been proposed in the past.

In particular, the invention seeks to provide a method based on a game that provides the player with the hope of actual winnings but without requiring the player to place any stakes at all.

Another object of the invention, starting from such a method, is to create an economic mechanism that presents growth that is self-sustaining.

More precisely, the invention seeks to develop emulation amongst existing and potential players leading to a "virtuous circle" in which the activity of the site increases with a large fraction of the revenue generated being redistributed amongst the players. The advertising receipts and the attractiveness of the game increase correspondingly, so the more there are players the more there will be advertisers and the more there are advertisers the greater will be the revenues.

SUMMARY OF THE INVENTION

To this end, the invention proposes a method of developing the activity of an on-line games site, the activity of the site being measured by a traffic index representative of the number of players participating in the game over a given time interval.

The game is a forecasting game, i.e. the site comprises a question engine coupled to a plurality of terminals controlled by respective players, the site sending questions to the players relating to a success parameter for at least one future event, the players responding by making forecasts on the success parameter. After the event(s) has/have occurred, the site evaluates the forecasts and allocates prizes to respective players, where appropriate.

The method comprises:

a) displaying, together with the questions sent to players, advertising insertions paid for on the basis of a given rate;

b) evaluating receipts associated with said paid-for advertising insertions;

c) setting up an endowment for sharing amongst a plurality of prizes for allocation over a given period of time, the endowment being a function of the level of said receipts;

d) on detecting an increase in the traffic index above a given threshold, correspondingly increasing said tariff for the advertising insertions;

e) on detecting an increase in said receipts above another given threshold, correspondingly increasing said endowment; and f) continuing and developing the activity by reiterating above steps d) and e).

According to a preferred characteristic of the invention, the future event can be a forecast relating to a TV broadcast, the success parameter being a function of the audience rating for said broadcast. Players can formulate forecasts before the broadcast and during the broadcast, up to some time limit prior to audience ratings being published. The future event could also be a sports forecasts.

The success parameter may be a quantified value representative of the event, the forecast being a function of said value. It may also be a selection, possibly in order, of M events selected from a plurality of N events, where $M \leqq N$, the forecast concerning said selection.

Advantageously, the method may include a prior stage of starting up the site, including building up a group of precursor players for whom the questions sent are displayed without advertising insertions, until an increase in the traffic index is detected above a given initial threshold leading to a switch to a stage of opening to advertising, in which said paid-for advertising insertions are displayed together with the questions sent to the players.

Preferably, the prizes are prizes having monetary value, the given period of time for sharing the endowment is a one-day period, and/or the endowment is a predetermined percentage of said level of receipts evaluated over said given period of time preceding the allocation of the endowment.

In a particular implementation, the display of advertising insertions comprises the player responding to a question asked by the site, by making a prior selection of an advertiser from a list of several possible advertisers shown to the player. The displayed advertising insertions are then insertions specific to the advertiser as selected in this way.

The method may also make provision, on each subscription of a new player with the site, for a prior stage of determining a profile for the user. The display of advertising insertions is then personalized as a function of said profile of the player.

The increase in the rate for advertising insertions may make provision for putting a ceiling on the area of said insertions and/or on the time insertions are presented.

BRIEF DESCRIPTION OF THE DRAWINGS

A particular implementation of the invention is described below in greater detail with reference to the accompanying drawings.

DETAILED DESCRIPTION OF A PREFERRED IMPLEMENTATION

Figure 1:
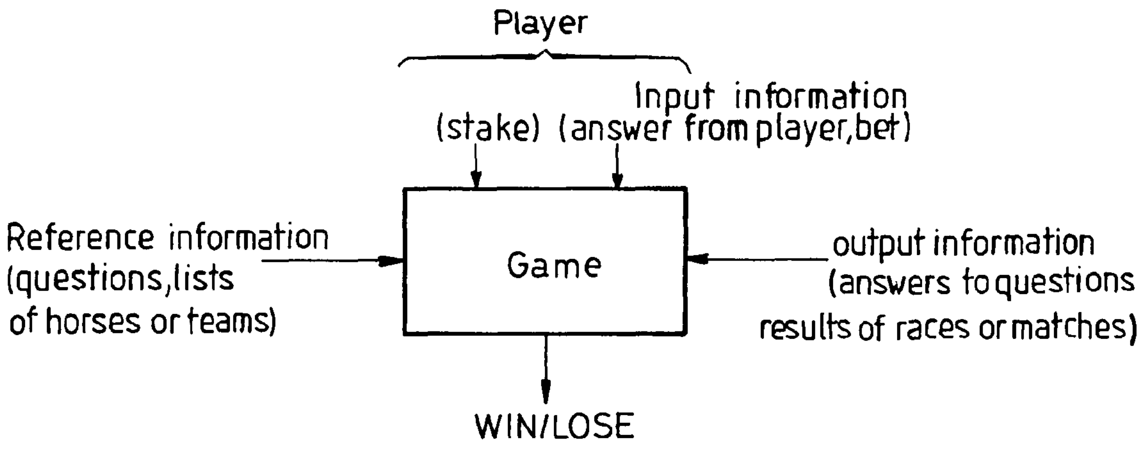
FIG. 1 is a diagram showing the various parameters and items of information involved in defining and playing a game.

As shown in FIG. 1, a game, and in particular an on-line game, may be considered as an information system based on a plurality of items of information either defined by the site, or provided by the player, with winning or losing being determined by the similarity or otherwise between said items of information.

This information comprises:

reference information, e.g. stating a problem to be solved by the player, the questions produced by a question engine, lists of TV programs, or even lists of horses or sports teams on which bets might be placed;

input information, provided by the player: for example an answer proposed to the problem or the questions, the order in which TV channels are preferred by viewers, or a combination of horses (first three, etc.), or sports teams the player hopes will win;

output information, originating internally in the site (the real solution to the problem put to the player, the exact answers to the questions), or being of external origin (the measured audience ratings of TV programs, the results of races or of matches); and usually, the stake requested of the player and corresponding to the risk the player is willing to accept in the hope of winning.

The definition of these various items of information can involve chance or luck to a greater or lesser extent, or it can even be essential, as in lotteries, casino games, etc.

A first characteristic of the invention is, on the contrary, that of relying on a game that is mainly deterministic in character, i.e. that has a chance content that is small or non-existent.

A second characteristic of the invention is that the game is a forecasting game, i.e. the player is requested to make a conjecture about a future event, which event is itself of essentially deterministic nature, i.e. it involves little or no chance elements, unlike, for example, games involving drawing lots.

A third characteristic is that the player is not required to place any stake, while nevertheless enabling the player to be tangibly gratified by genuine prizes (sums of money, purchase vouchers, articles, etc.), i.e. prizes having monetary value and not just non-monetary points: the player is confronted with tests, each enabling the player to win one such prize, solely on the basis of the merit shown.

It should be observed that the present invention relates to the container (the knack of the player), whereas the audience of TV programs, or sports forecasts, or indeed a game of the kind described in application U.S. Ser. No. 11/598,229 of Nov. 13, 2006 ("Computer-implemented game based on combinations of words") the disclosure whereof is incorporated herein by reference, are merely examples of content.

The method of the invention seeks to interest the player in the future event, to become informed about it, kindling interest that would not be possible to obtain:

if the game were based essentially on chance; or if the game did not enable genuine prizes to be won.

In the game used by the invention, the player is requested to formulate a forecast about a "success parameter" associated with the future event.

The parameter may be a binary, boolean parameter: for example forecasting that a stock exchange index will go up or down on a future day compared with the preceding day, whether or not it will rain tomorrow, whether such and such a sports team will win or lose, whether such and such a television channel will have a greater audience than some other channel, etc.

It may also involve selecting a small number of major themes from amongst N events: for example the best three TV programs, in order, or the three sports teams having the greatest scores in a particular day of a championship, the first three horses in a race, etc.—which selection may optionally be an ordered selection: the three best TV channels; the first three horses; or indeed the first three horses.

The success parameter may also depend on a quantified value representative of the event in question: for example the stock exchange index on the following day, expressed as a number of points.

It is also possible to combine a boolean success parameter with quantifying the success.

A particular example of such a forecast is that of a game relating to the audience of a TV broadcast. The audience is evaluated by an audience rating (quantified parameter), and the forecast may relate to determining whether the audience for one broadcast will be greater than or less than the audience for a competing broadcast on another channel. For example the forecast may be based on the question "Will the audience of the film on channel one be greater than the audience for the sports broadcast on channel two?"—the question naturally being put before the event occurs, or at any rate before the audience measurement result is made public. Forecasts may also be acceptable while the broadcast is taking place, so as to stimulate the interest of players and thus stimulate the traffic on the site.

A particular advantage of the system of the invention is that it assumes the players are watching the TV program, and everything that is said about it, in particular in the specialized media and TV program magazines.

For forecasts concerning the success (sales) of books, players will make their judgment on reading the books that are in the competition, or for forecasts about the success (sales) of records, players will make their judgment by listening to those records.

Or even, when making forecasts about the stock exchange, the forecast will be made as a result of an economic analysis of the sector to which the shares of the forecast belong.

For TV programs in particular, players can also make forecasts after the broadcast, up to some time limit prior to the publication of audience ratings, including electronic publication (for reception over the Internet, or when certain broadcasters display the recorded audience immediately after the program).

Figure 2:
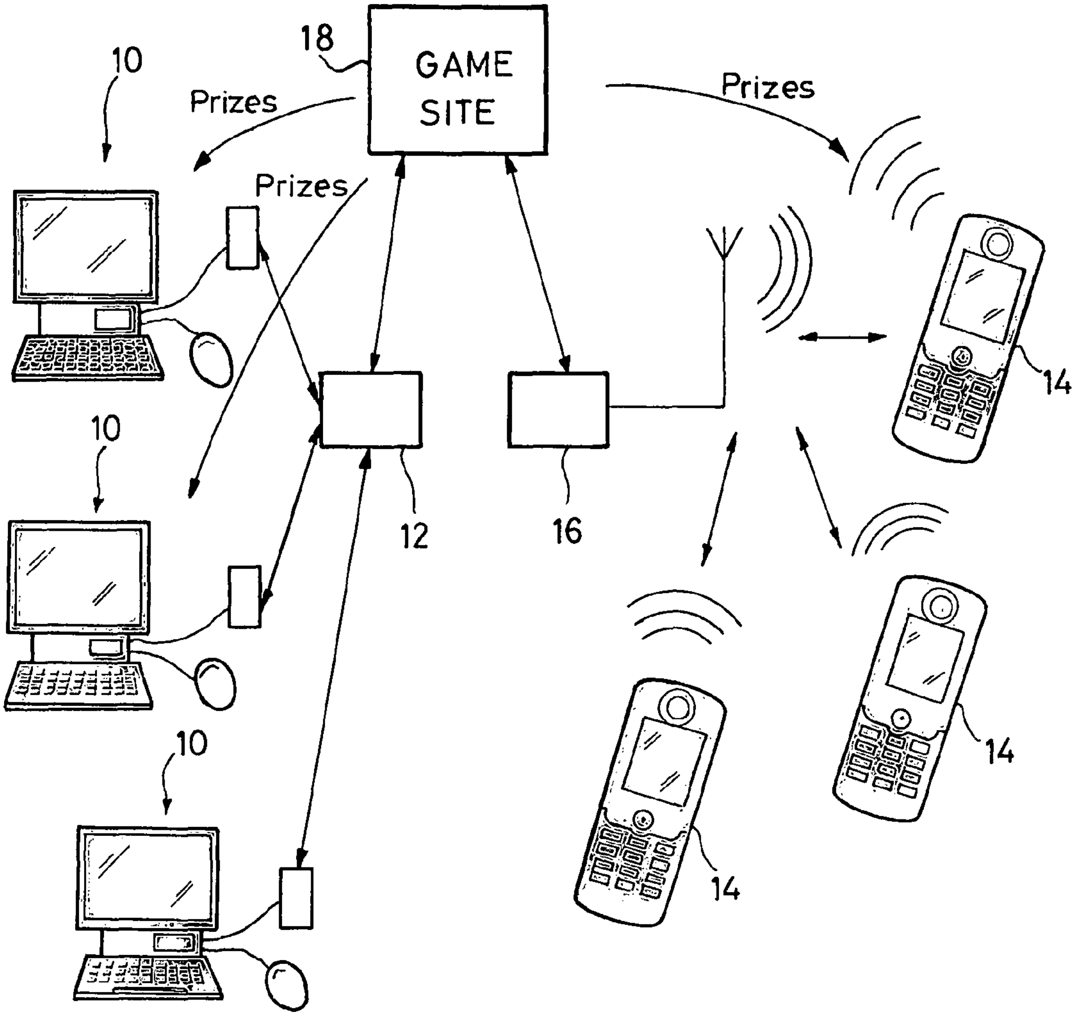
FIG. 2 is a diagram of a computer system enabling the invention to be implemented.

FIG. 2 shows a computer system enabling the invention to be implemented.

The invention can advantageously be implemented by an Internet site to which the user connects using a computer, but that technique is not limiting in any way, since the invention can be implemented otherwise, providing means exist for implementing both-way, interactive data exchange between the player and a remote site, i.e. the game site organizing the playing of the various steps in the method of the invention.

In particular, the invention can be implemented by means of mobile telephones or personal digital assistants capable of exchanging data with the game site via a cellular network, using any of the well-known technologies such as SMS, WAP, GPRS, UMTS-3G, etc.

The users of such networks can thus occupy idle moments (on public transport, in waiting rooms, etc.) by playing the game of the invention, in the hope of winning prizes.

In FIG. 2, reference 10 designates microcomputers used by players. Each microcomputer 10 is connected to a telecommunications network, which in this example is a terrestrial wired network such as the telephone network (in switched mode or in DSL mode), a cable TV network, or indeed a connection to the Internet via a common server having a plurality of stations.

The game may also be implemented by cell phones 14 having functions that enable them to exchange digital data using various well-known technologies such as SMS, WAP, GPRS, or UMTS-3G.

The computer terminals 10 or telephone terminals 14 are connected via appropriate respective interfaces 12, 16 to a game site 18 suitable for exchanging digital data with the terminals.

Each of the terminals can display text messages on a screen, in particular information received from the game site 18, with it being possible for a player to key-in alphanumeric data and send it in return to the game site 18.

In this respect, the game site 18, in combination with the interfaces 12 and 16, performs message formatting as a function of the type of terminal in use, i.e. computer or telephone terminal. Thus, for computer terminals 10, messages are formatted in such a manner as to enable them to be received and displayed in the form of web pages readable using a browser, while for mobile telephones, messages are, for example, formatted as WAP pages, that are more suitable for displaying on a screen of small size. Nevertheless, it should be observed that the content of the messages formatted by the game site 18 and by the interfaces 12 and 16, i.e. the wording of the information exchanged with the various terminals, is identical regardless of the formatting, and that the only difference lies in the layout whereby information can be displayed by computer terminals or by telephone terminals.

Furthermore, the computer and telephone terminals 10 and 14 are not dedicated to a particular user. A single user can have both a computer terminal 10 and a telephone terminal 14, either of which can be used depending on circumstances, for example depending on whether the user is at home or away. The user needs merely to be identified by the game site 18 using a conventional protocol, e.g. by dialing or keying-in a special telephone number or address, as the case may be, and then sending a subscriber number or identifier and a password (login).

The activity of the site is measured by a traffic index, representative of the number of players participating in the game over a given time interval, e.g. the number of different players that connect to the site over a single day.

The questions are generated by a question engine sending predefined questions to the players. Thereafter, the site receives, from the players, answers to the questions and it evaluates the pertinence thereof in order to award prizes to the players as a function of the answers it receives, where appropriate.

The presentation of the questions to a player is advantageously accompanied by editorial content, i.e. various explanations of an essentially informative nature seeking to provide the player with the main information that will allow the player to make a forecast in informed manner: details about programs when forecasts relate to TV broadcasts, etc., information about jockeys and horses and also about the race, the going, etc. when making forecasts about racing. This information can be presented in complete form, or else via hypertext links leading to specialist sites.

The screen also has fields enabling the player to formulate a forecast in as simple as possible a manner: a multiple-choice questionnaire with boxes to tick, a scroll-down menu, etc.

Figure 3:
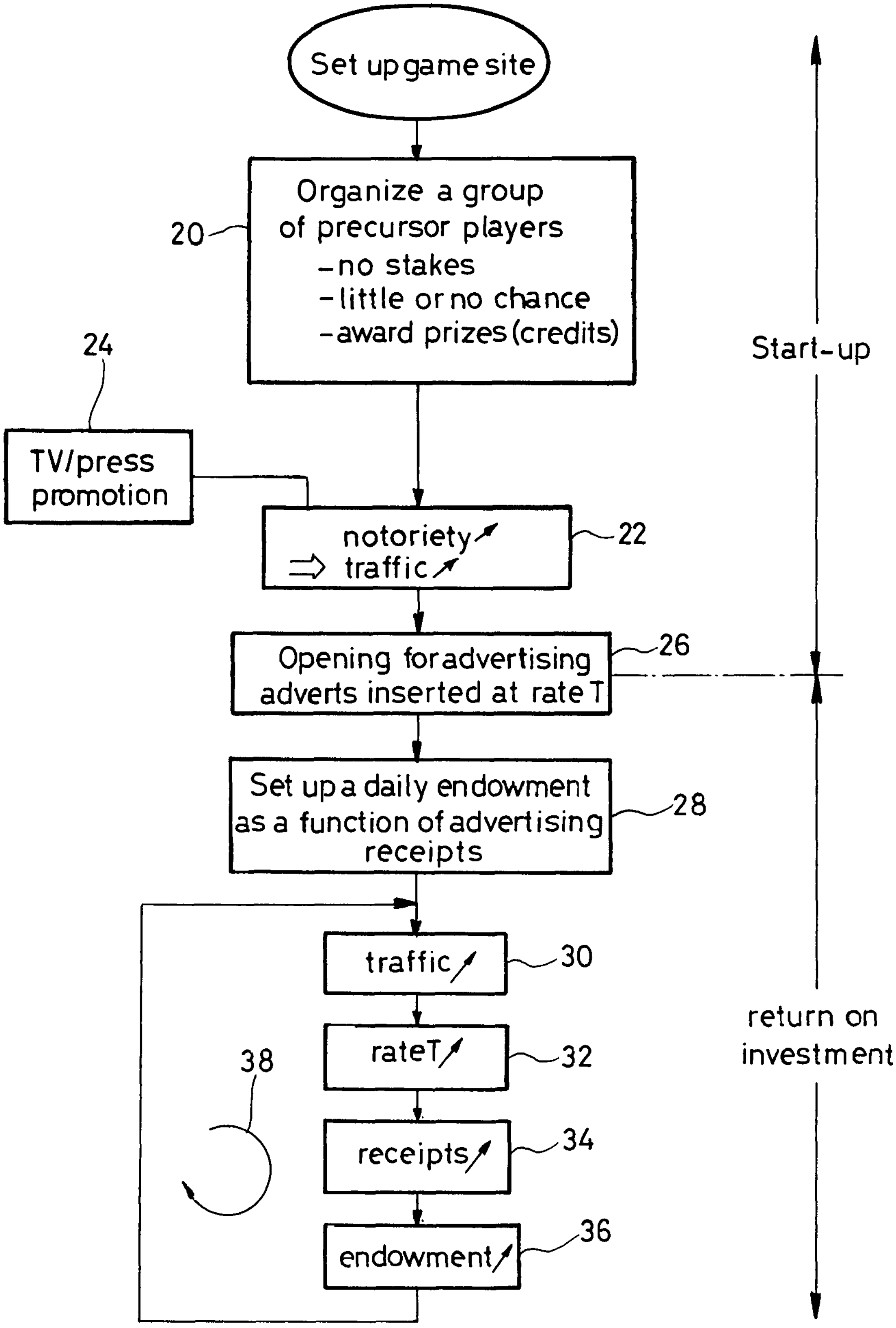
FIG. 3 is a flow chart showing the successive steps of the method of the invention.

The various stages of the process of developing the game site in accordance with the teaching of the invention are shown in FIG. 3.

Once the site has been put into place, an information campaign attracts surfers to the site so as to constitute a group of "precursor players" (step 20) acting, in a first stage, to trigger the development of the site.

For example, a simultaneous launch of the same game on a TV channel can incite surfers to play on the site, in particular because of a characteristic of the site that is put forward by the information campaign, i.e. the possibility of receiving actual winnings, for example a sum of money.

The surfer thus subscribes to the game site, giving an e-mail address and also a postal address so as to be able subsequently to receive prizes. No stake is requested of the user.

Once a subscriber, the user is faced with a first test, for example a game of sports forecasting.

For example, the player has a capital of 1000 points. For the World Cup, the player stakes 100 points at 10 to 1 on Italy against France and 10 points at 2 to 1 on Germany against Canada. Italy wins and Germany loses: the player is then automatically credited with $10\times100=1000$ points for the first bet, and debited by $2\times10=20$ points for the second bet.

Another example of a game that can be proposed is that of "weather forecasting", relating to tomorrow's weather: for example the player may bet that "rain in the morning" and "sunny afternoon". (In spite of being somewhat of a caricature, the weather forecast example is selected deliberately here to illustrate the simplicity of the mechanism.)

In the same manner as above, the player has a capital of 1000 points, and bets 100 points at 10 to 1 that tomorrow morning it will rain and 10 points at 2 to 1 that tomorrow afternoon it will be sunny. The following day it rains in the morning and also in the afternoon: the player is then automatically credited with $10\times100=1000$ points for the first bet, and debited by $2\times10=20$ points for the second bet.

The player's account is credited with a corresponding sum, e.g. $1 (or respectively has $0.02 deducted therefrom) if the rate for 1 point is $0.001.

Another example of a bet that might be proposed relates to voting on an act of Parliament (a recurring bet) or on the success of a referendum (an exceptional bet). Either way, the invention provides an instructive benefit in that it leads the player to come to an opinion about a bill or a text being submitted to a referendum. The procedure will be the same as in the preceding examples.

After a few days, the player will have accumulated a small sum, e.g. about $20, which can be paid by any appropriate means: a check in an envelope, a transfer to a bank account, credit on a telephone bill, electronic payment by a system such as PayPal (registered trademark), etc.

In the same manner as above, the player has a capital of 1000 points, and bets 100 points at 10 to 1 that tomorrow morning it will rain and 10 points at 2 to 1 that tomorrow afternoon it will be sunny. The following day it rains in the morning and also in the afternoon: the player is then automatically credited with 10×100=1000 points for the first bet, and debited by 2×10=20 points for the second bet.

The player's account is credited with a corresponding sum, e.g. $1 (or respectively has $0.02 deducted therefrom) if the rate for 1 point is $0.001.

After a few days, the player can thus accumulate a small sum, e.g. about $20, which can be paid to the player by appropriate means: a check in an envelope, a transfer to a bank account, credit on a telephone bill, etc.

The player is bound to spread the word about this good fortune to surfer friends.

As a result, the notoriety and the traffic of the site will increase (step 22), to reach several tens or hundreds of thousands of players.

This threshold is sufficient to attract the interest of advertisers, who will then apply to the operator of the site to place advertisements, e.g. banner type insertions or the like displayable on the screen presented to players.

The site thus opens to advertising (step 26). The operators of the site then begin to earn money, in amounts that are considerably greater than the costs of running the site: this begins a stage of a return on investment following the start-up stage.

The following step consists in setting up a daily endowment as a function of advertising revenues (step 28).

The site then lets it being known that henceforth it will pay players 50% of its advertising revenues, for example.

If daily revenues amount to $12,000, for example, then the site will pay out $6000 per day, subdivided into 111 prizes:

1 prize of $2000;

10 prizes of $200;

100 prizes of $20.

Such an outlook greatly increases the interest of surfers, who will be ever more numerous in their daily visits to the site (step 30). This enables the operator to raise advertising rates (step 32) accordingly.

This leads to an increase in receipts (step 34) and thus to an increase in the endowment that can be made available to players (step 36).

This increase in the endowment will itself lead to a further increase in traffic, thus making another increase in advertising rate possible, and thus in receipts, and so on, thereby triggering a "virtuous circle" (represented by the loop 38) suitable for further increasing the activity of the site.

Other variants can be applied to the implementation as described above.

For example, the display of advertisements can be made more interactive and specific by displaying at the beginning of a session a selection bar enabling the player to specify the advertiser or a group of advertisers whose banners will subsequently be displayed to the player during remainder of the session, or during all or part of a round.

The player can thus have the opportunity to select one particular theme from a plurality made available such as: computing, finance, cars, fashion, holidays, etc.

The player can also be asked to select an advertiser from amongst several, and even which of the various banners of that particular advertiser the player desires to see subsequently.

This technique serves to guarantee privileged exposure for a given trademark, and that also corresponds to the tastes and the personality of the player (since the player selected it), thus having better impact and justifying a higher rate for each insertion.

The various trademarks and banners can be selected in compliance with rules set out by an advertising space purchasing service as a function of guidelines relating to the way in which the advertiser seeks to ensure the presence of the trademark: duration of exposure to the trademark (determining the duration of the game or of a round of the game), time of day, periodicity, etc.

In general, in order to preserve the attractiveness of the site, it is nevertheless desirable to put a ceiling on the area and/or the time advertising insertions are presented. The drawback of such a ceiling is that it runs the risk of putting a ceiling on receipts, which can be compensated only by providing abundant editorial matter so as to increase the number of advertising spaces.

It is also possible to personalize advertising insertions by making them contextual, in the manner used by Adword or Adsense (trademarks registered by Google, Inc.) systems.

The insertions are then selected as a function of a qualitative profile of the player set up on the basis of a questionnaire filled in the by player when subscribing to the site.

By way of example, the profile questionnaire may be made up of a large number of closed, multiple-choice questions serving to evaluate the most personal tastes of the player. For example:

what are you doing next Sunday: cinema, theater, circus, restaurant, or museum?

do you prefer literary or scientific studies?

for your holidays, which do you prefer: seaside, mountains, countryside, traveling?

for governing the country do you prefer regionalization or centralization?

do you prefer a liberal or a planned economy?

etc.

This makes it possible to avoid cluttering the screen presented to players by the site with ever more intrusive banners, it being possible to replace them by small blocks (typically 128×128 pixels), or by hypertext links pointing to the sites of the advertisers as selected in this way as a function of the profile of the player.

The invention claimed is:

1. A method of developing the activity of an on-line game site, the site comprising a question engine coupled to a plurality of terminals controlled by respective players;

the activity of the site being measured by a traffic index representative of the number of players that have played the game over a given time interval;

in which method:

the question engine sends questions to players relating to a success parameter concerning at least one future event;

the players respond by providing forecasts on said success parameter; and after said event(s) has/have occurred, the site evaluates the forecast and allocates prizes to respective players, where appropriate;

a) displaying on the terminals, together with the questions sent to players by the question engine, advertising insertions paid for on the basis of a given rate;

b) evaluating receipts associated with said paid-for advertising insertions;

c) setting up an endowment for sharing amongst a plurality of prizes for allocation over a given period of time, the endowment being a function of the level of said receipts;

d) on detecting an increase in the traffic index above a given threshold, correspondingly increasing said tariff for the advertising insertions;

e) on detecting an increase in said receipts above another given threshold, correspondingly increasing said endowment; and f) continuing and developing the activity by reiterating above steps d) and e).

2. The method of claim 1, in which said future event is a TV broadcast and said success parameter is a function of the audience rating for said broadcast.

3. The method of claim 2, in which the players can formulate their forecasts before the broadcast and during the broadcast up until a time limit prior to audience results being published.

4. The method of claim 1, in which success parameter is a quantified value representative of said event, and the forecast is a function of said value.

5. The method of claim 1, in which the success parameter is a selection of M events from amongst a plurality of N events, with M≦N, and that the forecast concerns said selection.

6. The method of claim 5, in which said selection is an ordered selection of M events.

7. The method of claim 1, including a prior stage of starting up the site, including building up a group of precursor players for whom the questions sent are displayed without advertising insertions, until an increase in the traffic index is detected above a given initial threshold leading to a switch to a stage of opening to advertising, in which said paid-for advertising insertions are displayed together with the questions sent to the players.

8. The method of claim 1, in which said prizes are prizes having monetary value.

9. The method of claim 1, in which said given time period for sharing the endowment is a period of one day.

10. The method of claim 1, in which said endowment is a predetermined percentage of said level of the receipts evaluated over said given period of time preceding the allocation of the endowment.

11. The method of claim 1, in which the display of advertising insertions comprises the player responding to a question asked by the site, by making a prior selection of an advertiser from a list of several possible advertisers shown to the player, the displayed advertising insertions then being insertions specific to the advertiser as selected in this way.

12. The method of claim 1, comprising, on each new subscription of a player with the site, a prior stage of determining the player's profile, and in which the display of advertising insertions is personalized as a function of said profile of the player.

13. The method of claim 1, in which said increase in the tariff for advertising insertions is an increase with a ceiling on the area of said insertions.

14. The method of claim 1, in which said increase in the tariff for the advertising insertions is an increase with a ceiling on the presentation time of said insertions.

* * * * *